United States Patent [19]

Carle

[11] 3,995,789
[45] Dec. 7, 1976

[54] REEL SAFETY BRAKE

[75] Inventor: Clinton E. Carle, Lanham, Md.

[73] Assignee: The United States of America as represented by the Administrator of the National Aeronautics and Space Administration, Washington, D.C.

[22] Filed: Nov. 6, 1975

[21] Appl. No.: 629,456

[52] U.S. Cl. .................... 242/193; 242/57; 242/187; 242/204; 242/210
[51] Int. Cl.² .............. G11B 15/22; B65H 25/04; B65H 25/32
[58] Field of Search .......... 242/193, 194, 204, 210, 242/57, 187, 189, 54.1, 75.4, 75.45, 75.5, 45, 67.4, 67.5

[56] References Cited
UNITED STATES PATENTS

| 3,263,936 | 8/1966 | Williams | 242/194 |
| 3,637,154 | 1/1972 | Northup | 242/57 |

FOREIGN PATENTS OR APPLICATIONS

| 236,573 | 10/1925 | United Kingdom | 242/57 |

Primary Examiner—George F. Mautz
Attorney, Agent, or Firm—John R. Tresansky; Ronald F. Sandler; John R. Manning

[57] ABSTRACT

A braking apparatus for a tape transport device including first and second, stacked coaxial reels includes first and second feelers respectively mounted in proximity to the first and second reels for respectively sensing the tape being fully wound on the first and second reels. A brake means is mounted in proximity to adjacent, central hubs of the first and second reels. The brake means simultaneously, frictionally engages both hubs to brake both reels by virtue of a mechanical actuator being mechanically coupled to both feelers and the brake means. The brake means comprises a pair of rubber shoulders that extend in opposite directions relative to a common axis. The brake means turns about the axis in response to either of the feelers, which are eccentrically mounted relative to the axis, being turned about the axis. Thereby, in response to the first reel being fully wound with tape, the first feeler turns in a first direction about the axis so one of the brake shoulders engages the central hubs of both reels; in response to the tape being fully wound on the second reel the second feeler turns in the opposite direction so the second shoulder engages the central hubs.

13 Claims, 9 Drawing Figures

REEL SAFETY BRAKE

ORIGIN OF THE INVENTION

The invention described herein was made by an employee of the United States Government and may be manufactured and used by or for the Government for governmental purposes without the payment of any royalties thereon or therefor.

FIELD OF THE INVENTION

The present invention relates generally to brake mechanisms for reel-to-reel tape transport devices and more particularly to such a brake mechanism wherein a brake means is mechanically coupled to a hub of each reel by a mechanical connection to a feeler means sensing the tape being fully wound on either one of the reels.

BACKGROUND OF THE INVENTION

Reel-to-reel tape transport systems are widely employed in connection with magnetic tape recorders. For certain applications, it is necessary automatically to terminate playing of the tape from one reel to another in response to either of the reels being substantially completely filled with tape, i.e., in response to the other reel being substantially completely empty of tape. In the past, it has generally been the practice to provide electrical actuation of a mechanism to stop the tape transport mechanism in response to one of the reels being fully wound with, or completely empty of, tape. In certain situations, either for backup of the electrical system or as a primary brake means for preventing overwind of tape from a reel being emptied, electrical systems are not desirable because of reliability factors. In particular, if there is a malfunction to an electrical sensing component or any of the circuitry or power supplies for the electrical component, there is a failure to the system for deactivating the tape transport mechanism and tape will be completely exhausted from one of the reels, with obvious deleterious effects.

BRIEF DESCRIPTION OF THE INVENTION

In accordance with the broadest aspect of the present invention, a reel-to-reel tape transport device is braked by a feeler means sensing the tape being fully wound on either one of the reels. The feeler means mechanically activates a mechanical actuator that is mechanically coupled to a mechanical brake means for a hub of each reel. The brake means simultaneously frictionally engages the hub of each reel to brake both reels in response to the feeler means sensing that the tape is fully wound on either one of the reels. Hence, a completely mechanical system, with no electrical components, is provided to brake both reels simultaneously in response to one of the reels being substantially completely wound with tape, i.e., the other reel being substantially exhausted of the tape.

The invention is preferably employed with a tape transport device including first and second stacked coaxial reels, wherein a separate feeler is provided for each of the reels to sense when either one of them is fully wound with tape. The brake means is mounted in proximity to adjacent, centrally located hubs of the two reels to facilitate simultaneous engagement of both hubs. Preferably, the feelers and brake means are fixedly mounted to turn together on a common axis included in the mechanical actuator. The feelers are eccentrically mounted relative to the axis and are arranged with the brake means so that the brake means turns in first and second opposite directions in response to the first feeler sensing the first reel being substantially fully wound and the second feeler sensing the second reel being substantially fully wound. To this end, the brake means includes a pair of shoulders oppositely mounted relative to the axis, such that one of the shoulders engages the centrally located hubs in response to the feelers and brake means turning in the first direction, and the second shoulder engages the hubs in response to the feeler and brake means rotating in the second direction about the axis. By providing an eccentric mounting for the feelers, the brake means is rotated into contact with the hubs at a higher rotational speed than would be attained if the feelers were coaxial with the axis about which the brake means turns.

The brake actuator coupling the feeler and brake means together includes a shaft having a longitudinal axis coincident with the common axis on which the brake means and feelers turn. The feelers and brake means are integral with a sleeve bearing for the shaft. A first spring means biases the shaft against the bearing to bias the feelers against the tape when the tape is substantially fully wound on either of the reels. The spring biasing the shaft against the bearing also functions as a shock absorber for the brake mechanism.

To limit the travel of the actuated brake member, so that it does not travel past the periphery of the reel hubs being contacted, stops are provided to limit the rotation of the brake means and feelers in both turning directions. The stops also limit rotation of the feelers and brake so that the tape and brake contact each other only when the reel being wound is full.

A further feature of the invention is that the brake mechanism is returned to an unactivated, neutral or recentered position in response to the torque for driving one of the reels to the fully wound state being removed from the reels. This result is achieved by a second spring that drives the brake means and feelers in either direction, in a direction opposite from the bias applied by the first spring means when one of the reels became fully wound. Therefore, the force of the first spring means must be carefully selected so that it can be overcome by the force of the second spring when the driving torque for the fully wound reel is removed.

It is, accordingly, an object of the present invention to provide a new and improved braking mechanism for a reel-to-reel tape transport device.

Another object of the present invention is to provide an exclusively mechanical braking mechanism for a reel-to-reel tape transport device.

A further object of the invention is to provide a new and improved braking mechanism for a tape transport device including a pair of stacked coaxial reels.

An additional object of the invention is to provide an exclusively mechanical braking mechanism for a tape transport device including a pair of stacked coaxial reels having adjacent, central hubs.

A further object of the invention is to provide a mechanical braking mechanism for a reel-to-reel tape transport device wherein the braking mechanism is activated in response to either one of the reels being substantially completely wound with tape.

Yet another object of the invention is to provide a mechanical braking mechanism for a reel-to-reel tape transport device wherein the braking mechanism is automatically returned to a neutral, unactivated state after one of the reels has been completely wound with tape and the driving torque which causes the reel to be fully wound has been removed.

The above and still further objects, features and advantages of the present invention will become apparent upon consideration of the following detailed description of one specific embodiment thereof, especially when taken in conjuction with the accompanying drawing.

DETAILED DESCRIPTION OF THE DRAWING

Figure 1:
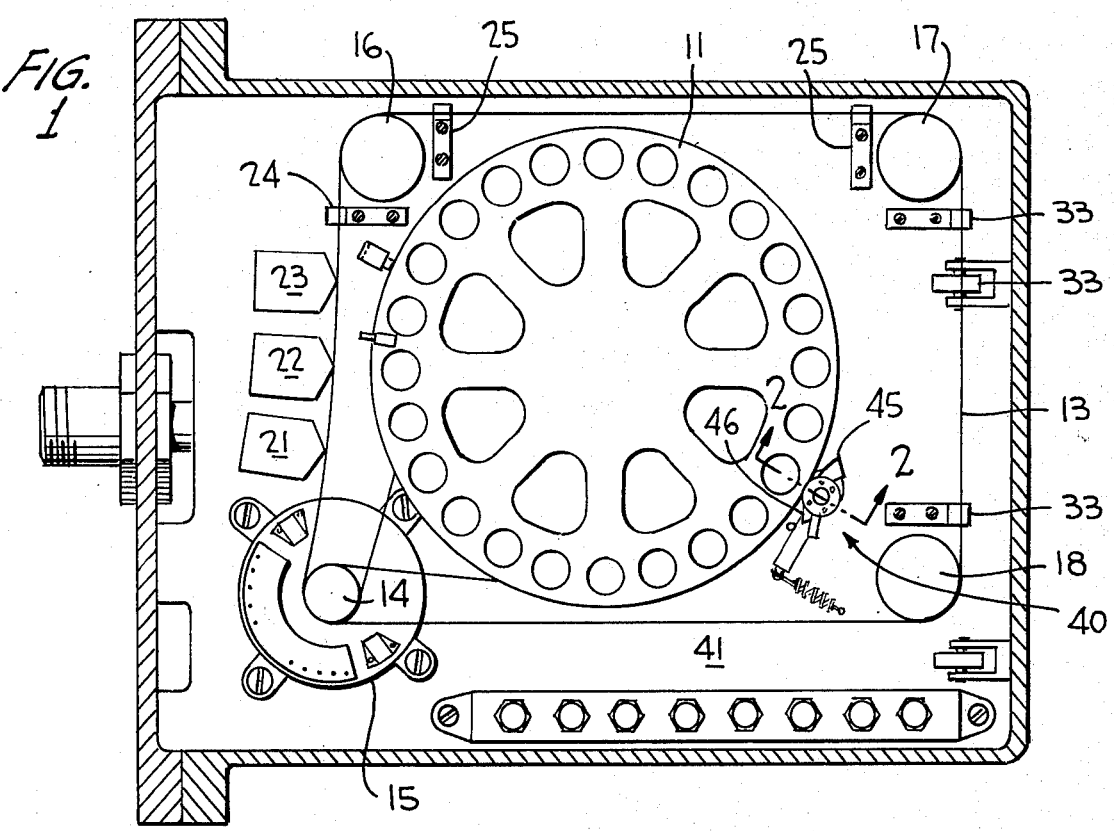
FIG. 1 is a top view of a preferred reel-to-reel tape recorder with which the present invention is particularly adapted to be utilized.
Figure 2:
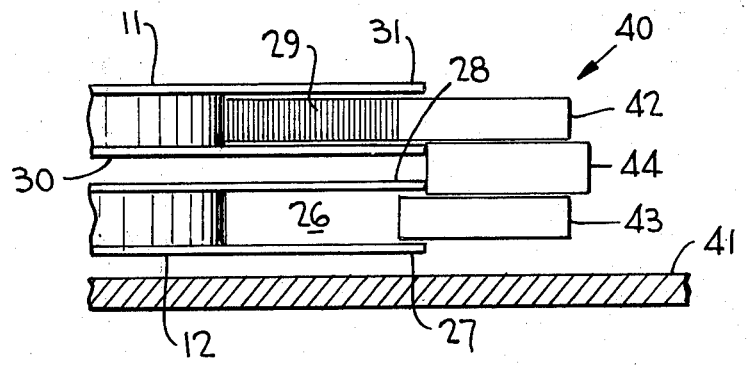
FIG. 2 is a side, schematic view, taken through the lines 2—2 of FIG. 1, illustrating the cooperation of the brake means and the recorder reels.

Reference is now made to FIGS. 1 and 2 of the drawing wherein there is illustrated a tape transport device including stacked, coaxial reels 11 and 12, which are mounted on a central shaft (not shown) for rotation in either the clockwise or the counterclockwise direction. Tape 13, preferably of the magnetic type, is played from reel 11 to reel 12 and vice versa, depending upon the direction of rotation of the shaft for reels 11 and 12. Tape 13 is wound about hub 14 of capstan and motor drive 15, as well as about idler rollers 16–18. Tape 13 traverses a path from bottom reel 12, approximately 180° about the bottom of hub 14, past recording, playback and erase heads 21–23 and tape retainer 24 about roller 16. After making a 90° turn about roller 16, tape 13 passes through tape retainer 25 and makes a second 90° turn about guide roller 17. The tape is at the same level as groove 26, between upper and lower hubs 27 and 28 of reel 12, as it traverses the path from reel 12 to roller 17. After traversing roller 17, tape 13 climbs past tape retainers 33 to the level of groove 29 in top reel 11, between hubs 30 and 31 of the top reel. After passing 90° about roller 18, tape 13 makes approximately a 180° turn about hub 14, and is played back into slot 29 of reel 11. Retainers 24, 25 and 33 are provided to limit the vertical motion of tape 13 when the recorder undergoes possible substantial acceleration.

The tape transport mechanism includes a negator spring between the drive motor and drive shafts of reels 11 and 12. The negator spring is provided so that the slack of one reel is taken up as the amount of tape being played on the other reel increases. Thereby, the force applied by the tape recorder drive motor to each reel is approximately the same, regardless of the amount of tape wound on a particular reel. Since the drive and negator spring for reels 11 and 12 do not form any part of the invention, they are not illustrated or described in detail.

In accordance with the present invention, mechanical brake mechanism 40 is provided for the tape transport drive. Brake mechanism 40 is fixedly mounted on horizontally extending top plate 41 of the tape deck so that it is in proximity to the periphery of hubs 27, 28, 30 and 31 of reels 11 and 12. Broadly, brake mechanism 40 includes top and bottom feelers 42 and 43 for respectively sensing that tape is substantially fully wound in slots 29 and 26 of reels 11 and 12. In response to one of feelers 42 or 43 sensing tape being fully wound on one of reels 11 or 12, the sensor activates a mechanical mechanism to cause brake 44 to be frictionally engaged with the peripheries of hubs 28 and 30 so that both reels 11 and 12 are substantially simultaneously braked and prevented from turning. To this end, brake 44 includes a pair of oppositely disposed shoulders 45 and 46 which are respectively rotated in the counterclockwise and clockwise directions to engage the peripheries of hubs 28 and 30 in response to feelers 42 and 43 respectively sensing the top and bottom reels being substantially completely wound with tape.

Figure 3:
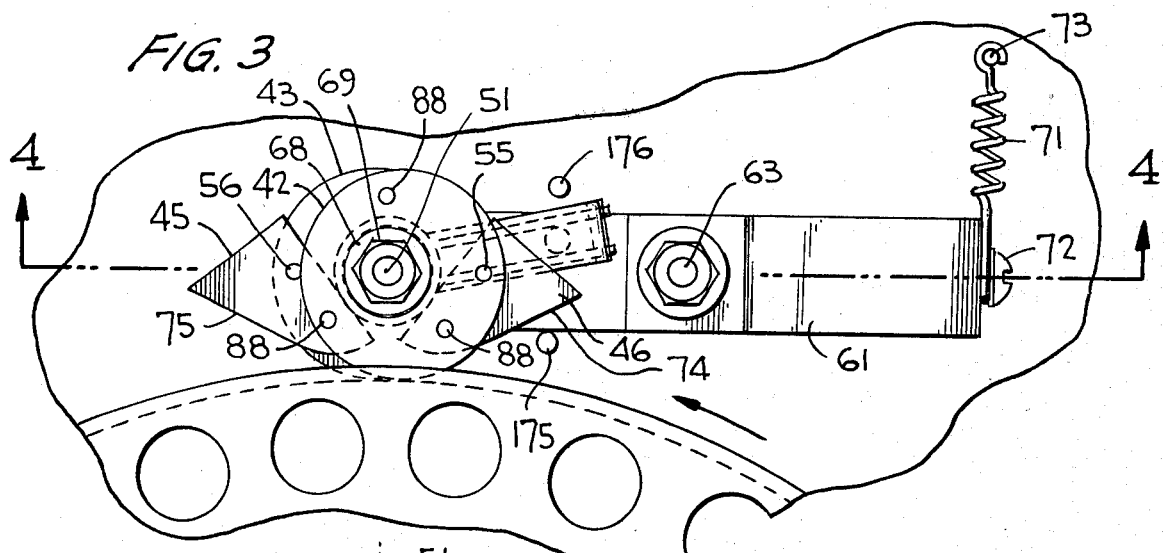
FIGS. 3 and 4 are respectively top and side sectional views of one embodiment of the present invention.
Figure 4:
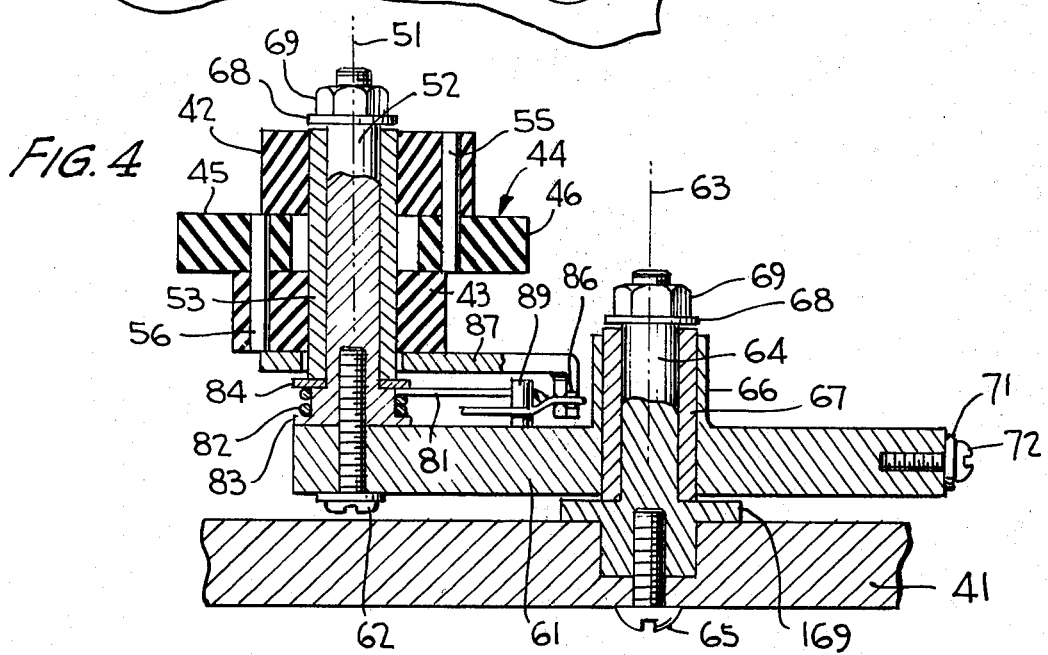
Figure 5:
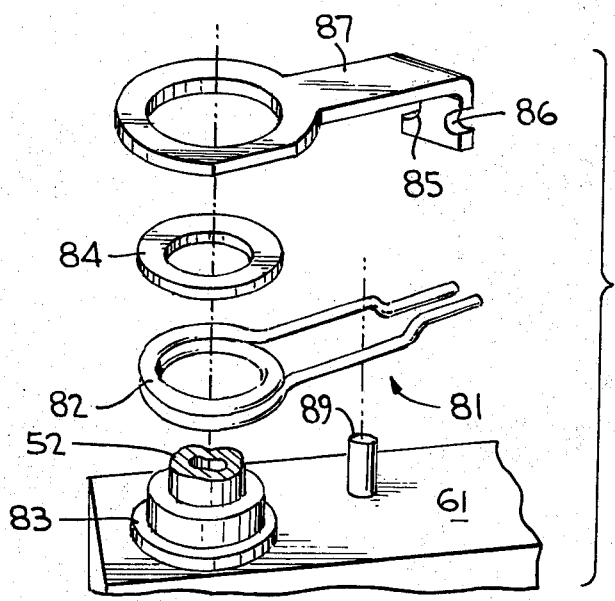
FIG. 5 is an exploded view wherein there are illustrated details of a recentering spring and its connection, in the embodiment of FIGS. 3 and 4.

Reference is now made to FIGS. 3–5 wherein there is illustrated one preferred embodiment of the brake mechanism of the present invention. Cylindrical feelers 42 and 43, as well as brake 44, are integrally mounted to each other and are mounted to rotate about a common axis 51, at the center of vertically extending shaft 52. Feelers 42 and 43 are eccentrically mounted on sleeve bearing 53, to which they are adhesively bonded. Feeler 42 is fixedly mounted to brake shoulder 46 by pin 55, while brake shoulder 45 is fixedly mounted to feeler 43 by pin 56. Adjacent surfaces of sleeve bearing 53, feelers 42 and 43, pins 55 and 56, as well as shoulders 45 and 46, are in contact with each other and are secured to each other by adhesive bonding to form an integral unit. A clearance of between 10 and 15 mils exists between the periphery of shaft 52 and the inner diameter of sleeve bearing 53. Each of feelers 42 and 43, as well as shoulders 45 and 46, is fabricated of Neoprene rubber to provide the proper friction between the feelers and tape 13, as well as between brake 44 and the vertical peripheral walls of hubs 28 and 30.

Feelers 42 and 43 are fabricated as the mirror images of each other so that they are oppositely, eccentrically mounted relative to axis 51. In the unactuated condition, a radius of reels 11 and 12 extends through axis 51 and intersects a cross-over point for the peripheries of feelers 42 and 43, i.e., the point on circular feelers 42 and 43 where the periphery of one feeler is common with the other feeler, as viewed from the top as illustrated in FIG. 3.

The assembly comprising feelers 42 and 43, brake mechanism 44, bearing 53 and shaft 55 is fixedly mounted at one end of horizontally extending pivot arm 61 by screw 62, projecting upwardly from the bottom of the arm into a threaded bore of shaft 52. Arm 61 is mounted to pivot remotely from axis 51, about axis 63 of vertically extending shaft 64 that is fixedly mounted to top plate 41 by screw 65 extending through a bore of the plate into a threaded bore of shaft 64. Arm 61 includes upwardly extending flange 66 that is integrally bonded with sleeve bearing 67, which in turn fits over shaft 64 with approximately the same tolerance as subsists between sleeve bearing 53 and shaft 52. Each of shafts 52 and 64 is maintained in situ by having a threaded stub, that extends upwardly from a shoulder which, in turn, projects slightly above the top of the sleeve bearing on which the shaft is journaled; washers 68 are mounted on the shoulders to engage nuts 69 that are threaded on the stubs. The bottom face of sleeve bearing 67 bears against an outwardly extending flange 169 that is integral with shaft 64; the flange rests on plate 41.

The end of arm 61 remote from axis 51 is connected to one end of shock absorbing tension spring 71, the other end of which is fixedly connected to top deck 41; the connections of spring 71 to arm 61 and deck 41 are by screw 72 and pin 73 that respectively extend into the arm and deck. Spring 71 exerts a force on arm 61 to bias feelers 42 and 43 into grooves 26 and 29 of reels 11 and 12, thereby biasing feelers 42 and 43 against tape 13 when the reels become substantially completely full. In response to reel 11 or 12 being substantially completely full of tape, the bias exerted by spring 71 is overcome by the force exerted by the tape against the periphery of feeler 42 or 43, thereby causing brake 44 to rotate in a clockwise or counter clockwise direction about axis 51.

In the situation illustrated in FIG. 3, reel 11 is assumed to be rotating in a counterclockwise direction so that, when the top reel becomes substantially completely full, feeler 42 engages the tape in reel 11 and thereby rotates in a clockwise direction about axis 51 to overcome the bias of spring 71, causing arm 61 to rotate about axis 63 in a clockwise direction so that the leading edge 74 of brake shoulder 46 contacts the peripheries of centrally located hubs 28 and 30 to brake reels 12 and 11. In contrast, in response to bottom reel 12 becoming full due to rotation of the bottom reel in the clockwise direction, feeler 43 is rotated in a counterclockwise direction about axis 51, causing arm 61 to pivot in the counterclockwise direction about axis 63 so that the leading edge 75 of brake shoulder 45 comes into braking engagement with the peripheries of centrally located hubs 28 and 30.

Arm 61 rotates about axis 63 in the clockwise or counterclockwise direction until one of vertically extending stops 175 or 176, fixedly mounted on deck 41 on opposite sides of the arm, is engaged by one of the vertical walls of the arm. Stop 176 prevents the brake assembly from overriding in response to top feeler 42 being activated, while the opposite result is achieved by stop 175 in response to the bottom feeler 43 being activated. In other words, the side of arm 61 opposite from edge 74 comes into contact with stop 176 as edge 74 is engaging the periphery of hubs 28 and 30 and the stop prevents further rotation of edge 74 into and possibly past the tape being accumulated in slot 29; a similar result is achieved by stop 175 as tape is being wound on the bottom reel. Stops 175 and 176 also limit rotation of arm 61 about axis 63 prior to reels 11 and 12 being substantially completely wound with tape so that feelers 42 and 43 are prevented from engaging the tape until the substantially full condition exists; i.e., stop 175 prevents feeler 42 from engaging tape in top reel 11 until the top reel is substantially completely full while stop 176 prevents feeler 43 from engaging the tape and bottom reel 12 until the bottom reel is substantially completely full.

In response to brake 44 being activated so that either edge 74 or 75 is urged against the periphery of hubs 28 and 30, manual or automatic means (not shown) is activated to reverse the direction of the motor driving reels 11 and 12, as well as hub 14. When the motor reverses, the negator spring causes the slack on the full reel to be taken up and to be transferred to the empty reel so that tape throw-off on the empty reel is prevented. When the torque driving reels 11 or 12 to the fully wound state is removed from the reels, it is necessary to restore the brake to the neutral position illustrated in FIGS. 3 and 4.

To these ends, a recentering mechanism, illustrated in detail in FIG. 5, is provided. The recentering mechanism includes a spring 81 including a coiled, compression segment 82 that is captured between flange 83 at the base of shaft 55 and washer 84 that rests on a flange of shaft 55 and supports sleeve 53. Spring 81 includes two relatively straight segments that extend from the top and bottom of coiled segment 82 into horizontally extending grooves 85 and 86 on opposite vertical edges of a flange that depends downwardly from horizontally extending alignment support plate 87. Plate 87 is fixedly secured to the integral assembly including feelers 42 and 43, as well as brake mechanism 44, by pins 88 and a suitable adhesive bonding material. The inner edges of both portions of spring 81 that extend from coiled segment 82 bear against the edges of pin 89 that extends upwardly from the top face of arm 61.

In response to the torque driving one of reels 11 or 12 to a substantially completely full state being removed so that braking is no longer needed, spring 81 causes the integral assembly comprising feelers 42 and 43, as well as braking means 44 to be returned to the neutral position. It is necessary for the restoring force of spring 81 and the force exerted by spring 71 to be designed so that the force of spring 81 exceeds that of spring 71 when the driving torque is removed and the motor reverses. The symmetrical construction of spring 81 and the manner in which the spring is mounted enable pivoting of the braking assembly in either direction about axis 51 when the motor reverses.

In summary, one of feelers 42 or 43 makes contact with the tape wound on one of reels 11 or 12 to rotate one of brakes 46 or 45 into play. Once one of brake shoulders 46 or 45 makes contact with one of the rims of tape reels 11 or 12, spring 71 is actuated and the feelers making contact with tape 11 is rotated out of engagement from the tape. The rotated brake alone then stops and holds the rims of both reels 11 and 12 to prevent lock-up of the feelers to the tape in the filled reel when reverse action occurs.

A problem with the structure illustrated in FIGS. 3–5 is that arm 61 and the mechanism attached thereto requires a relatively large amount of space. To reduce the space requirements, a brake mechanism of the type illustrated in FIGS. 6–9 may be provided. In the embodiment of FIGS. 6–9, top and bottom feelers or sensors 91 and 92 are adhesively bonded to brake means 93 which is located between the sensors so that brake means 93 can frictionally engage the peripheries of hubs 28 and 30 for braking action. Feelers 91 and 92 are eccentrically mounted on opposite sides of a central, vertically extending axis 94 that is coincident with the longitudinal axis of shaft 95. Feelers 91 and 92, as well as brake means 93, are bonded to sleeve 96, on which shaft 95 is journaled; elements 91–93 are also bonded to the interior surface of housing 97 that includes horizontally extending flanges 98 and 99 having circular apertures; shaft 95 and sleeve 96 extend through the circular apertures. Sleeve 96 is adhesively bonded to the periphery of the apertures in flanges 98 and 99 to provide a completely integral unit including the feelers 91 and 92, the brake means 93, sleeve 96 and housing 97.

Figure 7:
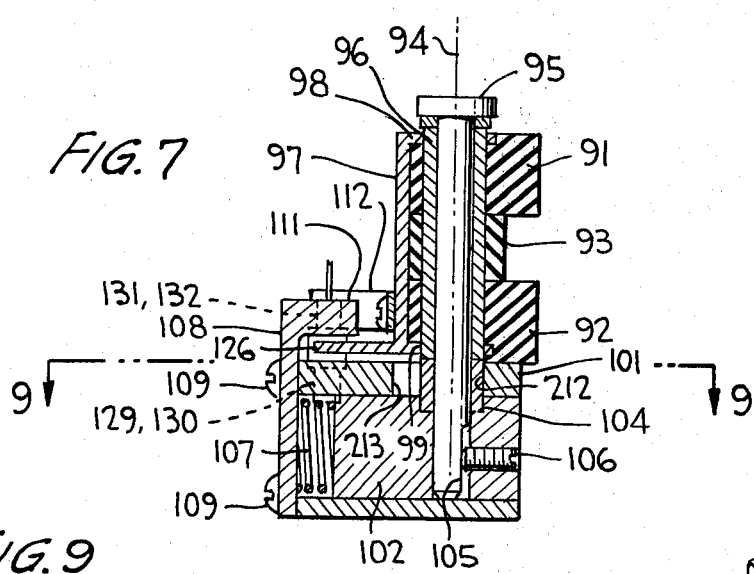
Figure 9:
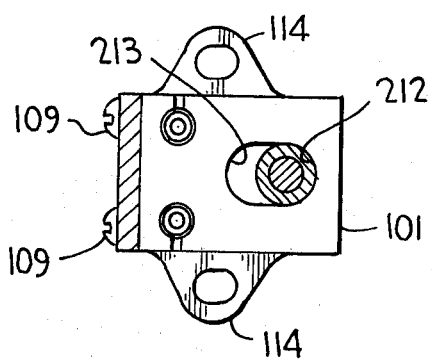
FIG. 9 is a top sectional view taken through the lines 9—9 of FIG. 7.

Shaft 95 is fixedly mounted relative to horizontally extending, hollow block 101. Block 101 includes a central, horizontally extending bore in which piston 102 fits. On the upper face of block 101 there is provided an aperture through which shaft 95 extends. Shaft 95 extends through the aperture and against a washer 104 that is captured in place by a groove in the upper edge of piston 102 and a corresponding groove in the upper face of block 101. The lower edge of sleeve 96 bears against the upper edge of washer 104. The parts are arranged so that there is a very close fit between the outer edge of washer 104 and the mating wall of block 101, on the right side of axis 94, as illustrated in FIG. 7. Shaft 95 is fixedly mounted, against rotation, since it is provided with a flat, keyed lower portion 105 that bears against the end of set screw 106 which extends horizontally through a threaded bore in the right face of piston 102.

Figure 8:
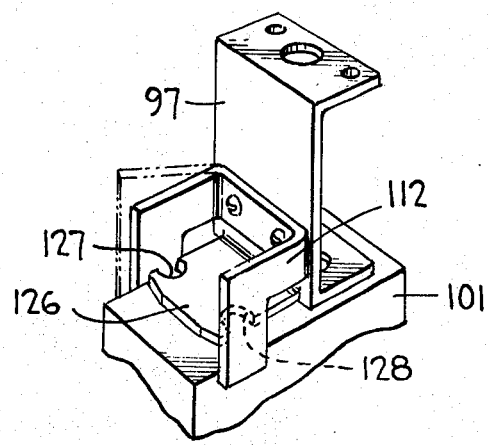
FIG. 8 is a perspective view wherein there are illustrated a recentering spring and the connections thereof in the embodiment of FIGS. 6 and 7.

Piston 102 is urged against the left circular face of shaft 95 by shock absorbing compression spring 107 that is horizontally loaded into block 101 and retained in place between the left face of piston 102 and an interior wall of plate 108 that is secured to the left edge of block 101 by screws 109. Plate 108 includes a horizontally extending flange 111 that extends inwardly toward axis 94, between the horizontally extending portions of leaf spring 112, which is fixedly mounted on a vertical face of housing 97. Extending from the horizontally extending portions of spring 112 are downwardly depending spring segments which selectively contact the left and right vertical faces of block 101, as illustrated in FIG. 8. The downwardly depending portions of spring 112 function in the same manner as coil spring 81 to return the brake mechanism of FIGS. 6-9 to the neutral position after the driving torque which caused one of the reels to become full has been removed. Spring 107 performs the same function as spring 71 to bias feelers 91 and 92 against the tape on reels 11 and 12, depending upon which reel is substantially completely full. The functions performed by stops 175 and 176 in the embodiment of FIGS. 3-5 are performed in the embodiment of FIGS. 6-9 by curved surfaces 212 and 213 at opposite ends of the slotted aperture on the top face of block 101.

The assembly of FIGS. 6-9 is secured in situ on plate 41 by securing screws (not shown) through slotted apertures 113 of tabs 114 that extend from the base of block 101. Apertures 113 are elongated to enable the position of the braking apparatus to be controlled relative to the periphery of reels 11 and 12 so that axis 94 lies along a radius extending through the center of the reels and eccentrically mounted feelers 91 and 92 have a common overlap through that radius.

Figure 6:
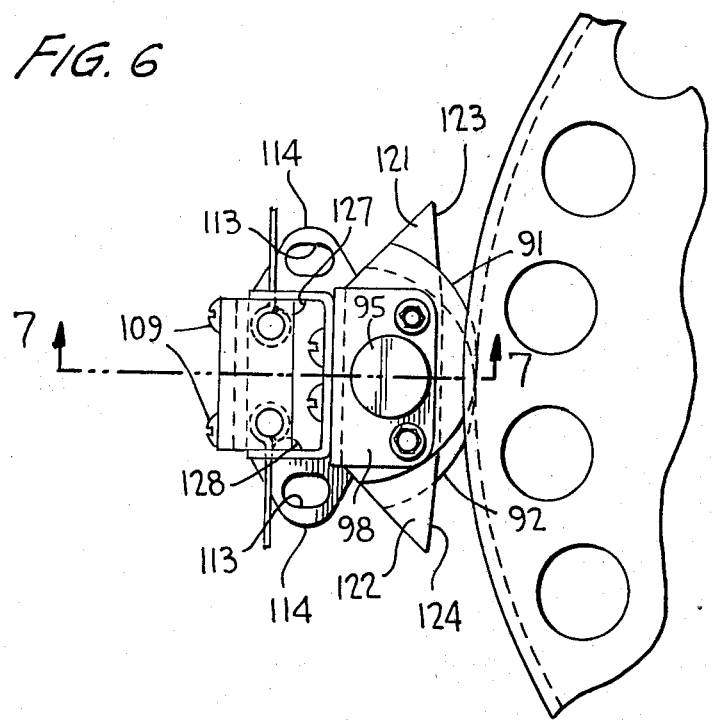
FIGS. 6 and 7 are respectively top and side sectional views of a second embodiment of the invention.

The operation of brake mechanism 93 is similar to that of brake mechanism 44 in that mechanism 93 includes a pair of oppositely extending Neoprene shoulders 121 and 122 having edges 123 and 124 that engage the vertically extending peripheral portions of hubs 28 and 30 simultaneously. To describe the operation of mechanism 93, assume that reel 11, FIG. 6, is rotating in a clockwise direction and is substantially completely full of tape 13. Thereby, the peripheral portion of tape 13 wound on reel 11 engages the face of feeler 91, causing the feeler, as well as brake assembly 93, to rotate in the clockwise direction about axis 94. Feeler 91 does not engage the tape until the reel is substantially completely wound, despite the bias of spring 107, because of the stop provided between washer 104 and surface 212 of block 101. In response to tape 13 in reel 11 engaging the periphery of feeler 91, the brake mechanism rotates in a clockwise direction, whereby edge 124 engages the vertical edges of centrally located hubs 28 and 30. Simultaneously, housing 97 rotates in the counterclockwise direction so that one of the vertically extending arms of spring 112 engages a vertical face of block 101. At the same time, the force exerted by the tape on feeler 91 causes piston 102 to be urged against spring 107 until the stop between the left edge of washer 104 and face 213 in the aperture at the top of block 101 is reached. The brake remains in the stated condition until the torque tending to drive reel 11 to the substantially completely full condition is removed. Removal of the torque enables the vertically extending portion of spring 112 engaging a vertical wall of housing 101 to restore the brake mechanism to its original, neutral position. In response to lower reel 12 being substantially completely full, due to counterclockwise rotation of reel 12, edge 123 of brake shoulder 121 engages the peripheries of centrally located hubs 28 and 30. Again, piston 102 is urged against spring 107 until washer 104 engages surface 113. Simultaneously, the other vertically extending arm of spring 112 comes into contact with the other vertical face of block 101 and the brake remains in the energized condition until the torque tending to turn reel 12 in the counterclockwise direction is removed. At this time, the restoring force of spring 112 causes the brake mechanism to return to the initial state, i.e., until the right edge of washer 104 and surface 212 in the aperture on the top face of block 101 contact each other.

In summary, for the embodiment of FIGS. 6-9, one of feelers 91 or 92 makes contact with the tape in a filled reel to rotate one of brake shoulders 121 or 122 into play. Once one of brake shoulders 121 or 122 contacts one of the rims of tape reels 11 or 12, spring 107 is actuated and the feeler making contact with tape 11 is rotated out of engagement from the tape. The rotated brake shoulder alone then stops and holds the rims of both reels 11 and 12 to prevent lock-up, when reverse action takes place, of the feeler which sensed that the tape filled one of the reels.

As an added feature, the mechanism of FIGS. 6-9 includes means for automatically sensing that the brake has been activated so that the drive of the motor for reels 11 and 12 can be automatically reversed. To this end, housing 97 includes a horizontally extending flange 126 having notches 127 and 128 on opposite edges thereof. In the normal position of the brake, flange 126 functions as a mask to prevent light from traveling between light emitting diodes 129 and 130 and light detecting diodes 131 and 132. In response to rotation of housing 97 and flange 126, one of notches 127 or 128 enables an optical path to be established between one of the light emitting diodes and one of the light detecting diodes. In response to the light detecting diode having light incident thereon, a signal is supplied by appropriate leads to electronic circuitry for controlling the direction of the motor which drives reels 11 and 12.

While there have been described and illustrated several specific embodiments of the invention, it will be clear that variations in the details of the embodiments specifically illustrated and described may be made without departing from the true spirit and scope of the invention as defined in the appended claims.

What is claimed is:

1. Apparatus for braking a tape transport device including first and second, stacked coaxial reels comprising first and second feelers respectively mounted in proximity to the first and second reels for respectively sensing the tape being fully wound on the first and second reels, brake means mounted in proximity to adjacent hubs of the first and second reels for simultaneously, frictionally engaging both hubs to brake both reels, and a mechanical actuator mechanically coupled to said first and second feelers and said brake means for simultaneously activating the brake means into frictional braking engagement with both hubs in response to either the first or second feelers sensing that the tape is substantially fully wound on either of the reels.

2. The apparatus of claim 1 wherein the feelers and brake means are fixedly mounted to turn together on a common axis included in said mechanical actuator, said feelers being eccentrically mounted relative to the axis and being arranged with the brake means so that the brake means respectively turns in first and second opposite directions in response to the first feeler sensing the first reel being substantially fully wound and the second feeler sensing the second reel being substantially fully wound.

3. The apparatus of claim 2 wherein the actuator comprises a shaft having a longitudinal axis coincident with the common axis, said feelers and brake means being integral with a bearing for the shaft, and spring means for biasing the shaft against the bearing and the bearing against the feelers and the feelers against the tape when the tape is substantially fully wound on either of the reels.

4. The apparatus of claim 3 wherein the brake means includes first and second shoulders mounted on opposite sides of the axis, said first shoulder engaging the hubs in response to the first reel being substantially fully wound with tape, said second shoulder engaging the hubs in response to the second reel being substantially completely wound with tape.

5. The apparatus of claim 3 further including stop means for limiting the turning of the feelers and brake means in response to either feeler sensing its respective reel being substantially fully wound.

6. The apparatus of claim 3 further including another spring means coupled to the shaft for returning the feelers and brake means to an unactivated position in response to the torque for driving the reels to the fully wound state being removed from the reels.

7. The apparatus of claim 3 further including an arm pivoted to turn about a second axis between its ends, said spring means and shaft being connected to said arm on opposite sides of said second axis.

8. The apparatus of claim 7 further including first and second stops positioned on opposite sides of said arm for limiting the turning of the feelers and brake means in response to either feeler sensing its respective reels being substantially fully wound.

9. The apparatus of claim 7 further including another spring means coupled to the shaft for returning the feelers and brake to an unactuated position in response to the torque for driving the reels to the fully wound state being removed from the reels, said spring means including: a tension spring portion coaxial with the common axis for longitudinally biasing a thrust member against the bearing, a second portion positioned on an arm radially extending from and fixedly secured to the bearing, and a third portion engaging a post extending from the arm.

10. The apparatus of claim 3 wherein the spring means comprises a spring loaded piston mounted to be biased for translation against the shaft at right angles to the common axis.

11. The apparatus of claim 10 further including first and second stops positioned on opposite sides of the common axis to limit the translation of the piston against the shaft.

12. The apparatus of claim 10 further including another spring means fixedly mounted to the brake means and feelers for returning the feelers and brake to an unactuated position in response to the torque for driving the reels to the fully wound state being removed from the reels, said spring means including: a leaf spring including an arm that is urged against a fixed member in response to the brake being activated, said fixed member being positioned to urge the spring in a direction opposite to the direction the spring turned in response to the feeler turning the brake means.

13. Apparatus for braking a reel-to-reel tape transport device comprising feeler means for sensing the tape being fully wound on each of the reels, brake means mechanically coupled to a hub of each reel for frictionally engaging the hub of each reel to brake the reel, and a mechanical actuator for activating the brake means for both reels in response to the feeler means sensing that the tape is fully wound on either of the reels, said mechanism actuator being mechanically coupled both to the means for sensing and to the brake means.

* * * * *